(12) United States Patent
Gruenhagen

(10) Patent No.: US 7,692,348 B2
(45) Date of Patent: Apr. 6, 2010

(54) ARRANGEMENT FOR FASTENING PERMANENT MAGNETS TO RAPIDLY ROTATING ROTORS OF ELECTRIC MACHINES

(75) Inventor: Thomas Gruenhagen, Velbert (DE)

(73) Assignee: ESW GmbH, Wedel (DE)

(*) Notice: Subject to any disclaimer, the term of this patent is extended or adjusted under 35 U.S.C. 154(b) by 360 days.

(21) Appl. No.: 11/875,136

(22) Filed: Oct. 19, 2007

(65) Prior Publication Data

US 2008/0093945 A1 Apr. 24, 2008

(30) Foreign Application Priority Data

Oct. 21, 2006 (DE) ................ 10 2006 049 825

(51) Int. Cl.
*H02K 21/12* (2006.01)
(52) U.S. Cl. .................. 310/156.19; 310/156.01; 310/156.55
(58) Field of Classification Search ............ 310/156.01, 310/156.12–156.13, 156.18–156.19, 156.55, 310/156.38, 156.69
See application file for complete search history.

(56) References Cited

U.S. PATENT DOCUMENTS

| | | | | |
|---|---|---|---|---|
| 4,219,752 A | * | 8/1980 | Katou .................. | 310/156.19 |
| 4,296,544 A | * | 10/1981 | Burgmeier et al. ........... | 29/598 |
| 4,336,649 A | | 6/1982 | Glaser | |
| 4,658,167 A | * | 4/1987 | Popov et al. ........... | 310/156.55 |
| 4,700,096 A | * | 10/1987 | Epars ..................... | 310/153 |
| 5,063,318 A | * | 11/1991 | Anderson ............. | 310/156.19 |
| 6,384,504 B1 | * | 5/2002 | Ehrhart et al. ......... | 310/156.55 |
| 6,452,301 B1 | * | 9/2002 | Van Dine et al. ....... | 310/156.12 |
| 6,492,754 B1 | * | 12/2002 | Weiglhofer et al. ..... | 310/156.08 |
| 6,606,232 B1 | | 8/2003 | Van Dine et al. | |

FOREIGN PATENT DOCUMENTS

| | | |
|---|---|---|
| DE | 84 27 704.1 | 1/1986 |
| DE | 100 53 692 | 5/2002 |
| EP | 0 143 693 | 6/1985 |
| EP | 0 779 696 | 6/1997 |
| EP | 1 750 349 | 2/2007 |
| JP | 08 079993 | 3/1996 |
| JP | 2003-143786 | 5/2003 |

* cited by examiner

*Primary Examiner*—Thanh Lam
(74) *Attorney, Agent, or Firm*—Eugene Ledonne; Joseph W. Treloar; Frommer Lawrence & Haug LLP

(57) ABSTRACT

The invention is directed to an arrangement for fastening permanent magnets to rapidly rotating rotors of electric machines. It is the object of the invention to find a novel possibility for fastening permanent magnets to the rotor of rapidly rotating electric machines which allows the magnets to be fixed so as to be secure against centrifugal forces for high rotating speeds and under confined spatial conditions without a frictionally engaging connection of magnet holders to the rotor. According to the invention, this object is met with a plurality of permanent magnets which are arranged at the outer circumference of the rotor with profile parts which are arranged alternately therebetween in that coaxially extending rotor grooves are introduced in the outer surface of the rotor, the sides of the rotor grooves having contact surfaces which at least partially converge outward with respect to radial direction for contact surfaces of the profile parts which diverge in a conforming manner, and the profile parts are shaped in such a way that they retain the permanent magnets pairwise in a claw-like manner in a positive engagement against radial forces of the rotor rotation. Gaps which inevitably remain at the contact surfaces for reasons of manufacture are filled with a liquid, hardenable medium.

30 Claims, 4 Drawing Sheets

ARRANGEMENT FOR FASTENING PERMANENT MAGNETS TO RAPIDLY ROTATING ROTORS OF ELECTRIC MACHINES

CROSS-REFERENCE TO RELATED APPLICATIONS

This application claims priority of German Application No. 10 2006 049 825.9, filed Oct. 21, 2006, the complete disclosure of which is hereby incorporated by reference.

BACKGROUND OF THE INVENTION a) Field of the Invention

The invention is directed to an arrangement for fastening permanent magnets to rapidly rotating rotors of electric machines. It is preferably applied in cases of special demands on mechanical strength at high peripheral speeds and high operating temperatures and suppression of eddy currents.

b) Description of the Related Art

Arrangements in which the magnets are fastened to a magnetizable rotor support by means of a glue and are fixed in place by a nonmagnetic wrapping are known in the prior art. This method is limited as far as its possible uses because of the limiting holding power of adhesives at elevated temperatures and large centrifugal forces due to high rotating speeds.

In another solution, the magnets are "buried" in a bundle of laminations. This method can only be applied in certain mechanical and magnetic designs and reduces the magnetic exploitation of the system.

Closed shells (wrappings) are another way to secure magnets to the rotor. Nonmagnetic wrappings of nonmetallic materials such as glass fibers, carbon fibers, various plastics and also of metals, e.g., nonmagnetic steel, aluminum or titanium, are known from the prior art. While wrappings of electrically conductive material usually have the disadvantage that the rotor parts are additionally heated because of the formation of eddy currents, wrappings of plastic fibers are often insufficiently stable (i.e., they exhibit impermissible elongation) at elevated temperatures in spite of the high cost of manufacture.

U.S. Pat. No. 6,603,232 B2 discloses a permanent magnet holding device for high-speed rotors in which the permanent magnets are placed in the outer rotor enclosure in inverted U-shaped retaining parts which are held by pole pieces that are screwed to the rotor enclosure in frictional engagement or connected directly to the rotor in a frictional engagement by screws. This frictionally engaging variant is disadvantageous primarily because of the risk that the screws will loosen by themselves due to vibrations, which requires that a stable outer wrapping is always provided in addition in order to reduce the safety risk.

OBJECT AND SUMMARY OF THE INVENTION

It is the primary object of the invention to find a novel possibility for fastening permanent magnets to the rotor of rapidly rotating electric machines which allows a reliable fastening of the permanent magnets for high rotating speeds and high temperature loads under confined spatial conditions without requiring that parts holding the magnets be screwed to the rotor in frictional engagement. In addition, eddy currents are kept to a minimum in the fastening parts. An extended object consists in protecting the magnets and magnet holders against external damage and preventing them from flying off due to the breakage of material.

In an arrangement for fastening permanent magnets to rapidly rotating rotors of electric machines with a plurality of permanent magnets which are fastened to the outer circumference of a cylindrical, soft-magnetic rotor and are fastened to the rotor by wedge-shaped or claw-like profile parts which are arranged alternately therebetween, the above-stated object is met, according to the invention, in that coaxially extending rotor grooves are introduced in the outer surface of the rotor, the legs or sides of the rotor grooves having contact surfaces which at least partially converge outward with respect to radial direction for contact surfaces of the profile parts which diverge in a conforming manner in order to hold the profile parts in a positive engagement against centrifugal forces, and in that the profile parts are formed of nonmagnetic material in such a way that they retain the permanent magnets pairwise in a claw-like manner in a positive engagement against centrifugal forces of the rotor rotation.

Gaps between the contact surfaces of the profiles parts and the rotor grooves and permanent magnets that occur as a result of manufacture are advantageously filled with a liquid, hardenable medium.

Adjacent rotor grooves advisably form a rotor web with contact surfaces which diverge outward with respect to radial direction, a profile part which engages the rotor web in a positive engagement is introduced longitudinally on the diverging contact surfaces, and the permanent magnets are embedded in the rotor grooves and are held in a positive engagement by diverging contact surfaces of the profile parts.

In a second construction, a profile part is advantageously inserted in narrow rotor grooves in a positive engagement so that the permanent magnets are arranged on the outer side of the rotor and are held in a claw-like manner in a positive engagement by diverging contact surfaces of two adjacent profile parts.

In a third advantageous construction, a coupling profile is inserted in each instance into the narrow rotor grooves and engages at the same time in a positive engagement in one of the profile parts, the permanent magnets are arranged on the outer surface of the rotor and held in a claw-like manner in a positive engagement by diverging contact surfaces of two adjacent profile parts. In this case also, the gaps resulting from manufacture between the contact surfaces of the profile parts, coupling profiles, rotor grooves and magnets are filled with a liquid, hardenable medium.

The rotor webs advantageously have a basic structure of T-profiles, but can also be advantageously modified to form triangular profiles or round profiles. The same geometric features also apply to the rotor grooves which are likewise formed as inverted T-profiles and can be changed to buried rotor grooves or triangular grooves (dovetailed guide).

For the above-mentioned third variant for fastening the permanent magnets by means of profile parts and coupling profiles, the coupling profiles preferably have a symmetric cross-sectional surface formed as a double T-profile in which triangular shapes or round shapes which are arranged in a mirror-symmetrical manner can form the projecting ends of the coupling profile.

The profile parts preferably have a broad wedge shape in the outer portion of their cross section or can form a kind of T-profile, so that they are symmetric with respect to a radial plane of the rotor. Because of this symmetry, the profile parts can advantageously also be assembled as divided profile rods.

In order to reduce eddy currents, the profile parts advantageously comprise a plurality of thin individual plates which are stacked to form a profile strand and are rigidly connected to one another by a glue to facilitate assembly of the stacked plates.

The rotor is also advantageously made of a plurality of circular electric sheets which are locked in a stack, preferably by means of an inner separate rotor carrier. In both cases (laminated profile parts and rotor periphery), the individual plates can advisably be insulated relative to one another by a nonconductive intermediate layer. The plates can be insulated from one another by a coating on at least one side, by a foil, or by an adhesive layer.

To protect against external damage and to prevent broken parts from flying out, the rotor with the profile parts and permanent magnets inserted longitudinally in a positive engagement at its outer circumference can be enclosed additionally by a wrapping.

A wrapping of the type mentioned above preferably comprises at least one wire which is wound in one layer and a hardening insulating sealing compound. The wire is advisably wound in such a way that the individual windings have no electric contact with one another. It has proven advantageous when an insulating layer is provided between the wound wire and the outer circumference of the rotor formed by profile parts and permanent magnets. The wire is preferably wound around the profile parts and the magnets with an exactly defined bias so that the magnets are biased against centrifugal forces occurring in radial direction.

The invention is based on the basic consideration that the centrifugal forces increase as the rotating speed of a rotor increases, so that the permanent magnets in an electric self-exciting machine (motor or generator) are accelerated radially outward and must be reliably secured in a corresponding manner. Previous types of fastening of permanent magnets were problematic particularly at high rotating speeds and high temperatures because the magnets were screwed or glued. On the one hand there is a risk that the screws will loosen by themselves, and on the other hand available glues exhibit ductile and therefore unstable behavior when heated by the occurring large radial forces. Also, known wrappings made of plastic fibers for fastening magnets have the disadvantage that they stretch to an impermissibly great extent at high rotating speeds, and metallic rotor enclosures lead to increased temperature due to additional formation of eddy currents.

The invention solves these multifaceted problems in that the magnets are held on the rotor in a positive engagement by wedge-shaped, claw-like profile parts which are fastened themselves as wedge-shaped parts in a positive engagement in longitudinal rotor grooves. Assembly can be realized easily by inserting the profile parts longitudinally in the profile cross sections of magnet strands, rotor grooves or rotor webs, which profile cross sections are adapted to one another. A liquid hardenable sealing compound is introduced into the manufacture-related gaps occurring between the different profiles and, after hardening, provides a fixed connection between the rotor, magnets and profile parts. The contact surfaces that are loaded by radial forces are acted upon exclusively by pressure so that the hardened compound need not have any tensile strength in particular.

The invention makes it possible to fasten permanent magnets to the rotor of rapidly rotating electric machines in such a way that they are protected reliably and permanently against mechanical loads, particularly those caused by radial forces, at high rotating speeds and high temperatures under confined spatial conditions without a frictional connection. Eddy currents in pole pieces and fastening parts are kept low by additional measures, and the magnets and magnet holders are protected against external damage and prevented from flying off due to breakage.

The invention will be described more fully in the following with reference to embodiment examples.

DESCRIPTION OF THE PREFERRED EMBODIMENTS

Figure 1:
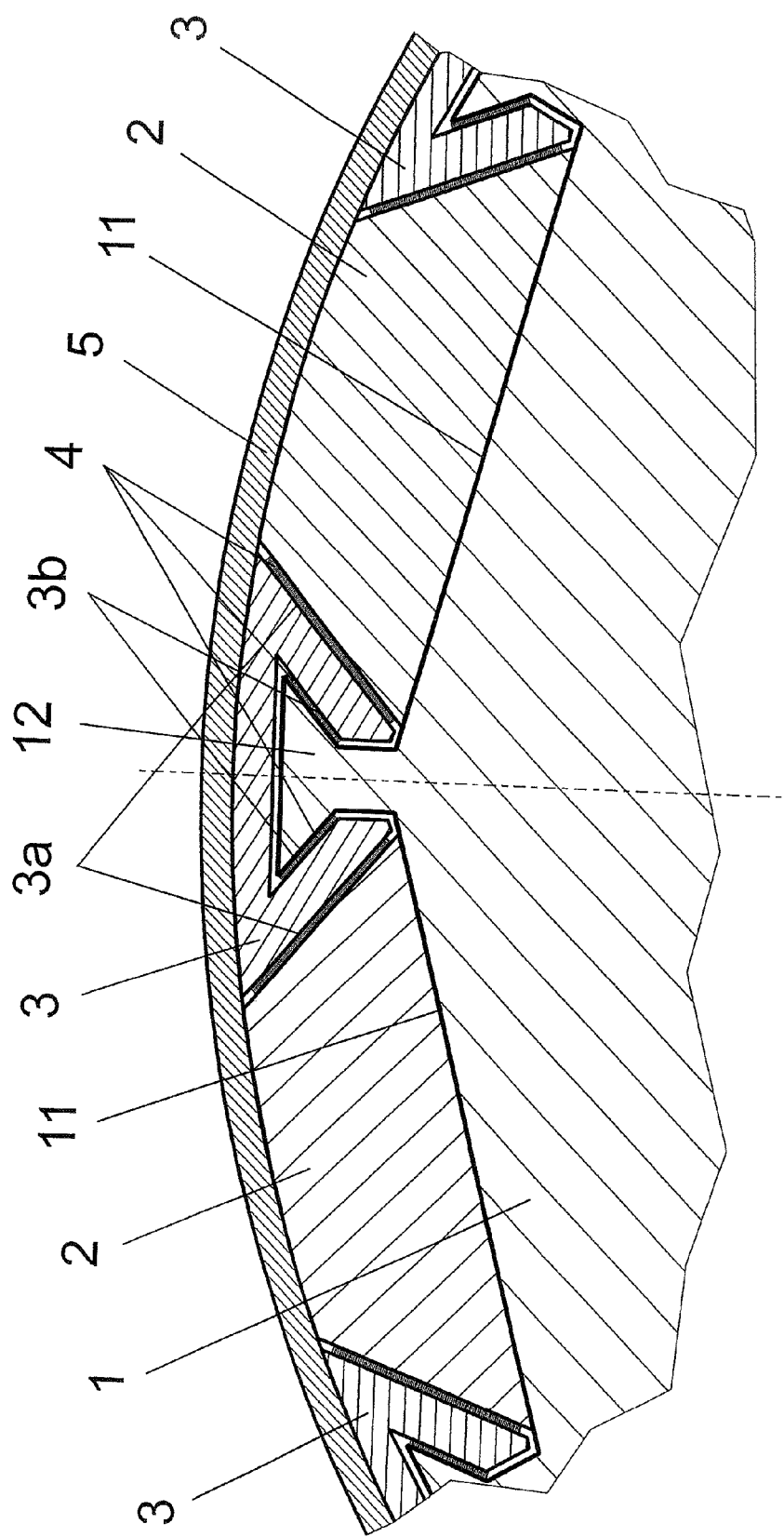
FIG. 1 shows a peripheral section from the rotor cross section in a schematic view of a fastening of the permanent magnets according to the invention by means of profile parts which are fixed radially in a positive engagement at the sides of coaxially oriented rotor grooves.
Figure 5:
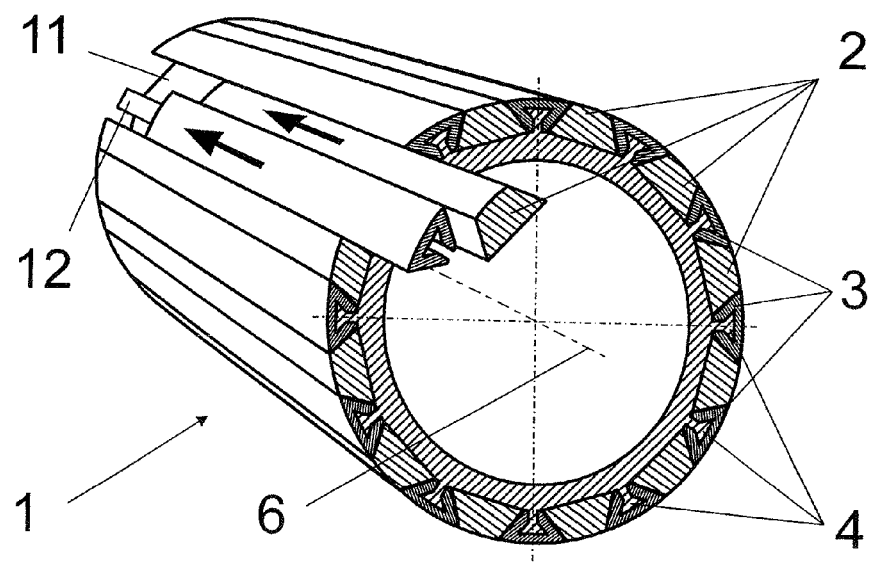
FIG. 5 is a schematic view illustrating the principle of assembly of the magnet fastening according to the invention with the permanent magnets and profile parts inserted coaxially into the rotor grooves.

As is shown by FIG. 1 viewed together with FIG. 5, the invention basically comprises a rotor 1 which is shaped as a cylindrical body, longitudinally oriented permanent magnets 2 being arranged so as to be evenly distributed at its periphery and fastened to the rotor 1 by profile parts 3 which are arranged therebetween so as to engage radially in a claw-like or wedge-shaped manner and which have contact surfaces 3a and 3b that diverge symmetrically in pairs. The profile parts 3 hold the permanent magnets 2 by means of contact surfaces 3a which diverge in pairs outward viewed in radial direction, and the profile parts 3 themselves are likewise secured against radial forces by positive engagement by contact surfaces 3a at the rotor 1 which diverge in pairs at the sides of rotor grooves 11 or rotor webs 12 arranged therebetween.

The profiles which are defined in this way are adapted to one another, i.e., the shapes of the sides of the rotor grooves 11 or rotor webs 12 and of the sides of the permanent magnets 2 have surfaces extending parallel to one another for every two pairs of sides with the contact surfaces 3a and 3b of the profile parts 3.

In order to fasten the permanent magnets 2 and the profile parts 3 to the rotor 1, they are inserted longitudinally into the rotor grooves 11. The voids (gaps) which inevitably remain due to technical reasons relating to manufacture are filled with a liquid, hardenable medium 4. After pouring, the medium 4 hardens completely due to a chemical reaction and/or thermal treatment resulting in a firm, positively engaging connection between the rotor 1 and the magnets 2. A suitable selection of the connection geometry ensures that the hardened gap-filling medium 4 is acted upon exclusively by pressure at the surface regions 3a and 3b of the profile parts 3 at the magnets 2 and at the rotor grooves 11 or rotor webs 12 and that the radial tensile forces (centrifugal forces) are absorbed only by the profile parts 3 and by the sides of the rotor grooves 12. Accordingly, a relatively low tensile strength of the gap-filling medium 4 has no influence on the maximum transmissible forces because the latter are determined almost exclusively by the tensile strength and by the geometric shape of the profile parts 3 and rotor grooves 11 or rotor webs 12.

Without limiting the variety of possible shapes, FIGS. 2a to 2f show examples for geometries of conforming rotor webs 12, profile parts 3 and permanent magnets 2. The examples show a first basic variant for fastening the magnets 2 in which the profile parts 3 are placed on a rotor web 12 along generated lines of the rotor 1.

The profile of the rotor web 12 is principally assumed to be a T-shape which ranges from a broad wedge shape (obtuse equilateral triangle, FIG. 2a, to pronounced corners FIGS. 2b, c, d) to rounded T-profile shapes (FIGS. 2e, f).

Figure 2:
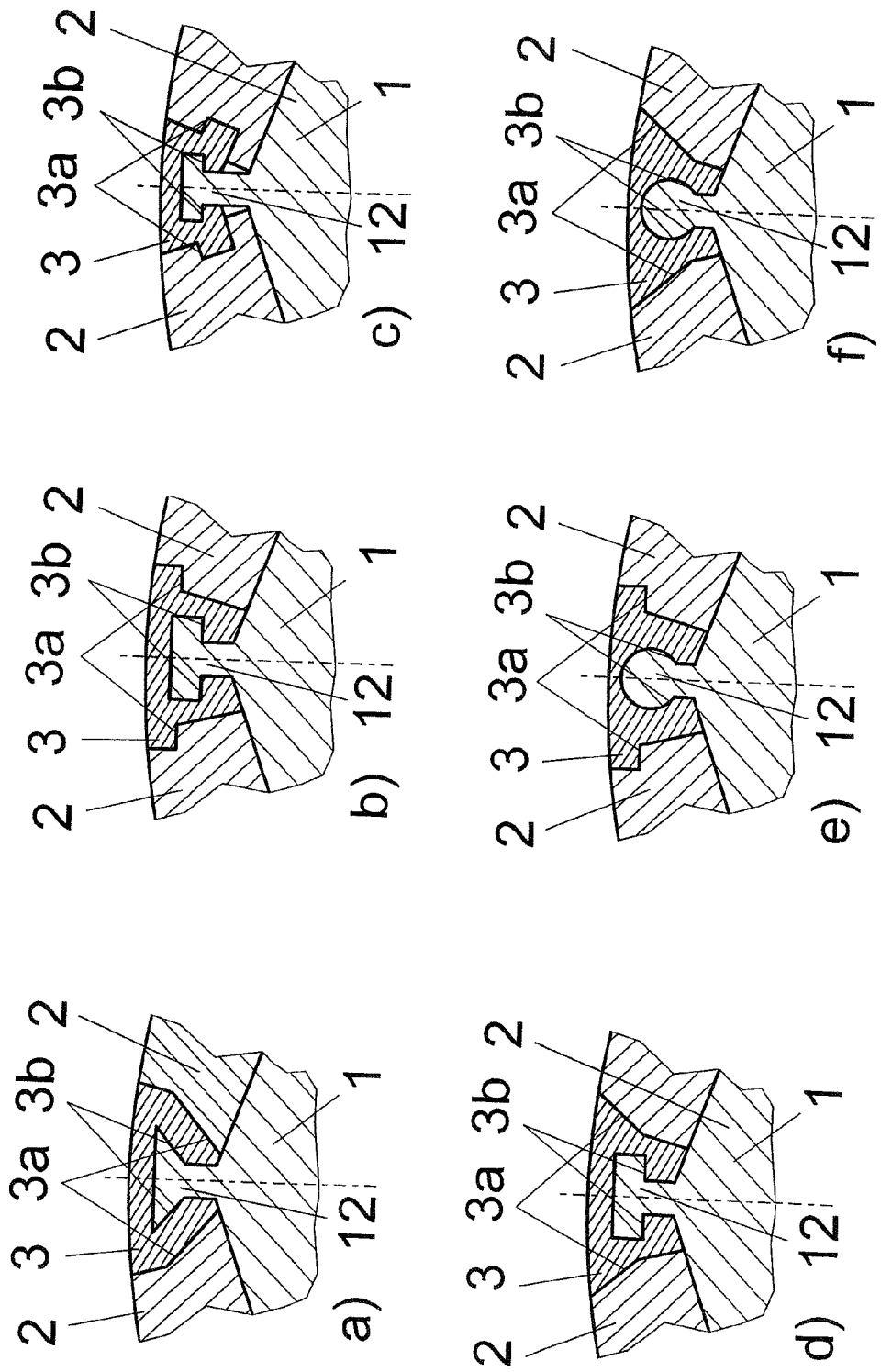
FIG. 2 shows six constructional forms for the profile parts in a first variant for fastening the permanent magnets in which the webs engage directly in the profile parts between the rotor grooves of the rotor.
Figure 3:
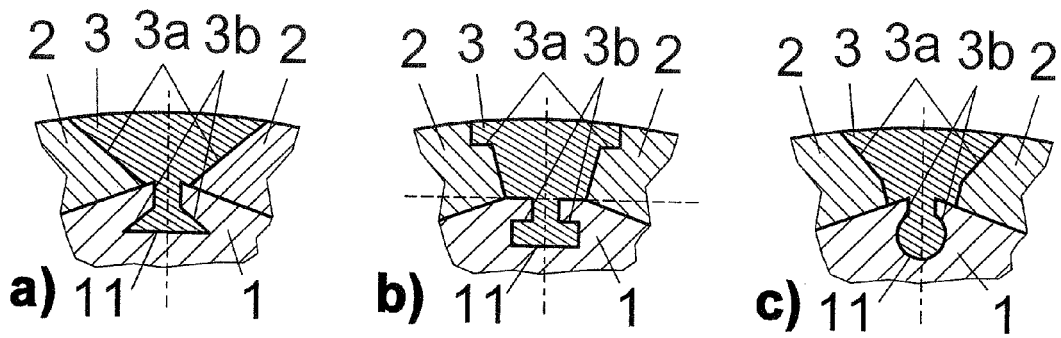
FIG. 3 shows three constructions of the profile parts for a second fastening variant in which the profile parts engage directly in suitably shaped rotor grooves.

Without limiting the possible variety of shapes, FIG. 3 shows three constructions for a second variant for fastening the permanent magnets 2 to the rotor 1. In this variant, the profile parts 3 are inserted into a narrow rotor groove 11. For this purpose, the profile parts 3 have a shaped portion which is adapted to the rotor groove 11 and which can be shaped like the profiles disclosed for the rotor webs 12 (FIG. 2). Similar to those shown in FIG. 2, the contact surfaces 3a for the magnets 2 range from a pronounced wedge shape to a tangentially projecting shape in order to secure the magnets 2 in the same way against radial forces in a positive engagement with a sufficient edge overlap.

Figure 4:
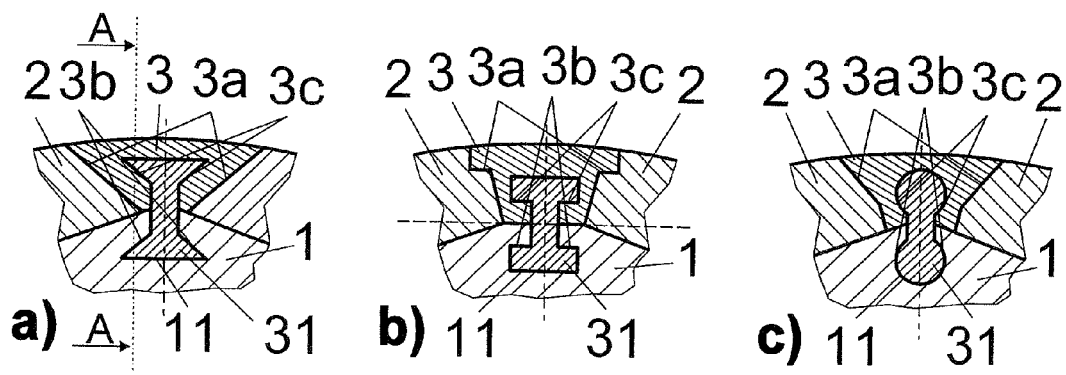
FIG. 4 shows three constructions of the profile parts for a third fastening variant in which suitably shaped coupling profiles engage in the profile parts and in the rotor grooves.

FIG. 4 shows a third fastening variant in which the rotor grooves 11 are provided in the rotor 1 in the same way as in the example shown in FIG. 3, but in this case a coupling profile 31 with a double-T shape produces the positive engagement to the profile parts 3. The profile parts 3 can have the shapes which are shown by way of example in FIG. 2.

The magnets 2 and profile parts 3 as well as any coupling profiles 31 that may be added are assembled in accordance with the schematic view shown in FIG. 5. Although it is only shown for the first fastening variant according to FIGS. 1 and 2a, it will be readily appreciated by the person skilled in the art that the assembly is effected in the same manner for the second and third fastening variants by inserting the profile parts 3 longitudinally into the rotor grooves 11. It should be noted that the magnets 2 need not be inserted longitudinally in every case (as shown by the arrow on the magnet 2 in FIG. 5). Rather, in most cases the magnets 2 can simply be inserted in radial direction and only the profile parts 3 inserted longitudinally in conclusion.

For reasons of clarity, the gap-filling medium 4 and optional wrapping 5 are not shown.

After carrying out assembly by positive-engagement, the gap-filling medium 4 is introduced into the gaps between the magnets 2, profile parts 3 (and any coupling profiles 31 that may be provided) and rotor webs 12 (or rotor grooves 11) by immersing in a low-viscosity, hardenable medium, e.g., multi-component epoxy resin or polyester resin. Hardening is effected by a chemical reaction and can be accelerated by deliberate heating and its characteristics optimized.

Figure 6:
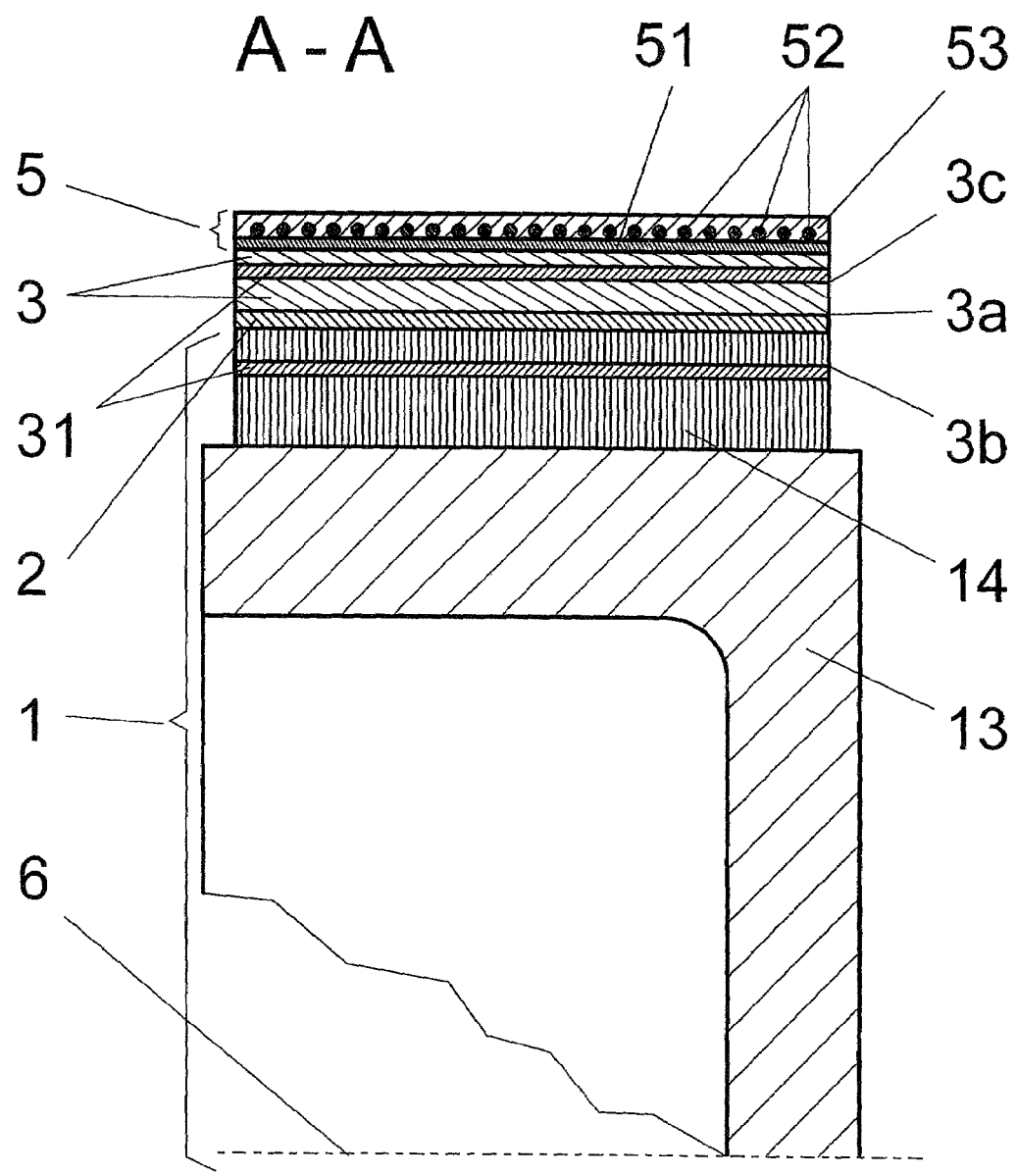
FIG. 6 shows a longitudinal section through the rotor along plane A-A, according to the view in FIG. 4a, in a sectional view through all of the three load-carrying contact surfaces of the profile part and coupling profile.

FIG. 6 shows a variant for completing the high-speed rotor using a wrapping 5 for closing the periphery of the outer functional layer of the rotor 1 of magnets 2 and profile parts 3 for reliable operation.

In order to protect the permanent magnets 2 from external damage and to prevent broken pieces from flying off, the rotor constructions described in the preceding examples are provided with an additional wrapping 5. To prevent additional heat (due to eddy current losses in metal wrappings) and unwanted risk of stretching (in spite of the high manufacturing cost for plastic fiber wrappings), a wrapping 5 is produced in the rotor arrangement according to the invention to protect the magnets 2 from external damage and to prevent magnet pieces from flying out by using nonmagnetic wire 52. For this purpose, the outer surface of the magnets are first coated with a thin, electrically and magnetically nonconductive separating foil 51. The thin, nonmagnetic wire 52 (e.g., VA steel, titanium, etc.) is then wound helically around the outer layer of the rotor 1 which is lined with the separating foil 51 and formed of magnets 2 and wedges 3. Care must be taken that the individual windings of the wire 52 do not contact each other. After the entire outer circumference of the rotor 1 has been wound in a helical manner, the windings of wire 52 are sealed with a liquid sealing compound 53 or dipped. After the sealing compound 53 has hardened, a very heavy-duty wrapping 5 results.

To simplify production of the compete machine part, the same material used for the gap-filling medium 4 between the profile parts 3 and the rotor 1 and magnets 2 (for fixing the surface regions 3a, 3b and possibly 3c) can be used as sealing compound 63, and the sealing and subsequent hardening can be carried out in one operation.

While the foregoing description and drawings represent the present invention, it will be obvious to those skilled in the art that various changes may be made therein without departing from the true spirit and scope of the present invention.

REFERENCE NUMBERS

1 rotor
11 rotor groove
12 rotor web
13 rotor carrier
14 laminated rotor bundle
2 magnet (permanent magnet)
3 profile parts
3a diverging contact surface (toward magnets)
3b diverging contact surface (toward rotor)
3c diverging contact surface (toward shaped piece)
31 coupling profile
4 (gap-filling) medium
5 wrapping
51 separating foil
52 wire
53 sealing compound
6 rotor axis

What is claimed is:

1. An arrangement for fastening permanent magnets to rapidly rotating rotors of electric machines with a plurality of permanent magnets which are fastened to the outer circumference of a cylindrical, soft-magnetic rotor and are fastened to the rotor by wedge-shaped or claw-like profile parts which are arranged alternately therebetween, comprising:

coaxially extending rotor grooves being introduced in the outer surface of the rotor;

sides of the rotor grooves having contact surfaces which at least partially converge outward with respect to radial direction for contact surfaces of the profile parts which diverge in a conforming manner in order to hold the profile parts in a positive engagement against centrifugal forces; and said profile parts being formed of nonmagnetic material in such a way that they retain the permanent magnets pairwise in a claw-like manner in a positive engagement against centrifugal forces of the rotor rotation.

2. The arrangement according to claim 1, wherein gaps between the contact surfaces of the profile parts and the rotor grooves and permanent magnets that occur as a result of manufacture are filled with a liquid, hardenable medium.

3. The arrangement according to claim 1, wherein adjacent rotor grooves form a rotor web with contact surfaces which diverge outward with respect to radial direction, a profile part which engages the rotor web in a positive engagement is introduced longitudinally on the diverging contact surfaces, and the permanent magnets are embedded in the rotor grooves and are held in a positive engagement by diverging contact surfaces of the profile parts.

4. The arrangement according to claim 1, wherein a profile part is inserted in the rotor grooves in a positive engagement so that the permanent magnets are arranged on the outer side of the rotor and are held in a positive engagement by diverging contact surfaces of two adjacent profile parts in a claw-like manner.

5. The arrangement according to claim 1, wherein a coupling profile is inserted in each instance into the rotor grooves and engages at the same time in a positive engagement in one of the profile parts, wherein the permanent magnets are arranged on the outer surface of the rotor and held in a positive engagement by diverging contact surfaces of two adjacent profile parts in a claw-like manner.

6. The arrangement according to claim 5, wherein gaps resulting from manufacture between the contact surfaces of the profile parts, coupling profiles, rotor grooves and permanent magnets are filled with a liquid, hardenable medium.

7. The arrangement according to claim 1, wherein the rotor grooves are shaped as T-profiles.

8. The arrangement according to claim 1, wherein the rotor grooves are shaped as triangular profiles.

9. The arrangement according to claim 1, wherein the rotor grooves are shaped as round profiles.

10. The arrangement according to claim 3, wherein the rotor webs are shaped as T-profiles.

11. The arrangement according to claim 3, wherein the rotor webs are shaped as triangular profiles.

12. The arrangement according to claim 3, wherein the rotor webs are shaped as round profiles.

13. The arrangement according to claim 5, wherein the coupling profiles are shaped as double T-profiles.

14. The arrangement according to claim 5, wherein the coupling profiles are shaped as mirror-symmetrical double-triangular profiles.

15. The arrangement according to claim 5, wherein the coupling profiles are shaped as mirror-symmetrical double-round profiles.

16. The arrangement according to claim 1, wherein the profile parts have a symmetrical cross section with respect to radial direction.

17. The arrangement according to claim 16, wherein the profile parts have a broad wedge shape in the outer portion of their cross section.

18. The arrangement according to claim 16, wherein the profile parts have a kind of T-profile in the outer part of their cross section.

19. The arrangement according to claim 16, wherein the profile parts comprise two profile strands which are divided along their plane of symmetry.

20. The arrangement according to claim 1, wherein the profile parts comprise a plurality of thin individual plates which are stacked to form a profile strand.

21. The arrangement according to claim 20, wherein the individual plates are insulated relative to one another by a nonconductive intermediate layer.

22. The arrangement according to claim 21, wherein the individual plates are insulated relative to one another by a coating on at least one side.

23. The arrangement according to claim 21, wherein the individual plates are insulated relative to one another by a foil.

24. The arrangement according to claim 20, wherein the stacked individual plates are rigidly connected to one another by gluing.

25. The arrangement according to claim 1, wherein the rotor, as tubular body, comprises a plurality of circular electric sheets which are locked in a stack on an inner, separate rotor carrier.

26. The arrangement according to claim 1, wherein the rotor with the profile parts and permanent magnets inserted coaxially in a positive engagement at the outer circumference is enclosed by a wrapping.

27. The arrangement according to claim 26, wherein the wrapping comprises at least one wire which is wound in one layer and a hardening insulating sealing compound.

28. The arrangement according to claim 27, wherein the wire is wound helically around the rotor in such a way that the individual windings have no electric contact with neighboring windings.

29. The arrangement according to claim 28, wherein an insulating layer is provided between the wound wire and the profile parts and permanent magnets at the outer circumference of the rotor.

30. The arrangement according to claim 28, wherein the wire is wound around the profile parts and the magnets with an exactly defined bias so that the magnets are biased against centrifugal forces occurring in radial direction.

* * * * *